April 20, 1965   H. B. SHEFFIELD ET AL   3,179,009
HAVING PLURAL REFLECTING SURFACES LANE REFLECTOR
Filed Sept. 18, 1962

INVENTOR.
HAROLD B. SHEFFIELD
MARTIN R. CHRISTOFFERSON

ATTORNEY

3,179,009
LANE REFLECTOR HAVING PLURAL REFLECTING SURFACES

Harold B. Sheffield and Martin R. Christofferson, San Rafael, Calif., assignors to H. Koch & Sons, Corte Madera, Calif., a corporation of California
Filed Sept. 18, 1962, Ser. No. 224,338
3 Claims. (Cl. 88—79)

This invention relates to reflectors for marking lanes on highways, runways, taxi strips and the like.

The primary object of this invention is to provide reflector lane markers which reflect the light from vehicles brightly and in which the reflected light is enhanced by additional reflection from base flanges which practically double the luminosity of the reflector over and above usual simple reflection.

Another object of the invention is to provide a reflector for lane marking and the like which will not damage the tires of vehicles riding thereover, and which is sturdy and durable, and which is so constructed that it protects itself and keeps itself clean from dirt, mud, highway or airfield smudge.

Another object of the invention is to provide on such reflector a base arrangement which prevents edges from flaring upwardly under heavy weight and which are formed into suitable rain apron to protect the reflector surface and which also function from magnifying reflection.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

Figure 1:
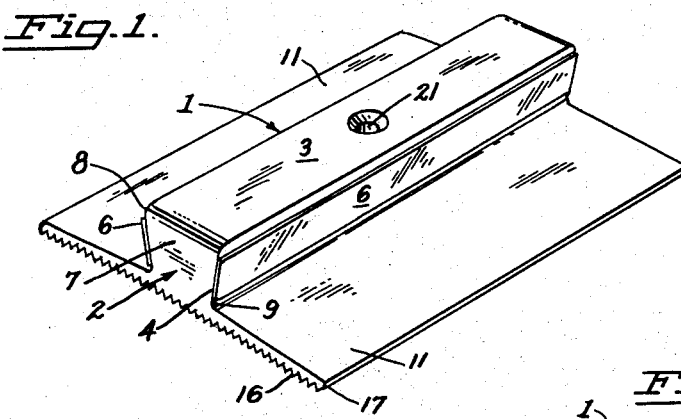
Figure 4:
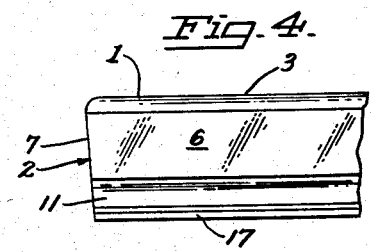
Figure 2:
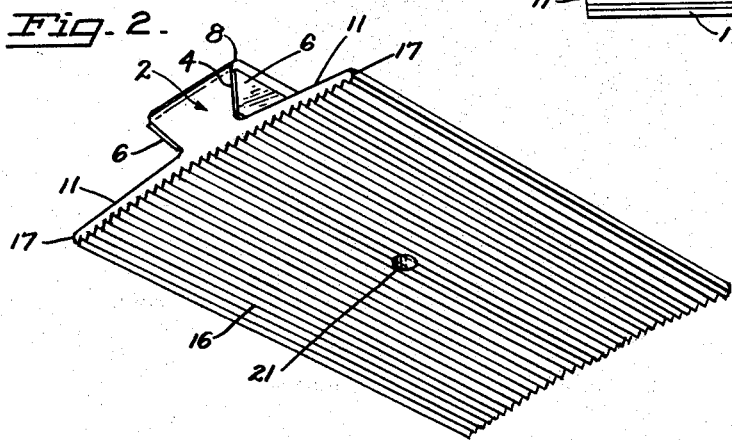
Figure 3:
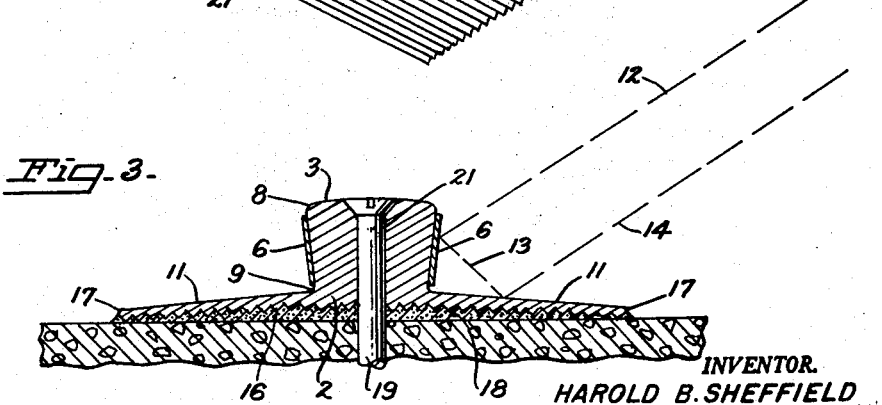

With the foregoing and other objects in view, which will be made manifest in the following detailed description, reference is had to the accompanying drawings for the illustrative embodiment of the invention, wherein:

FIG. 1 is a perspective top view of the reflector.
FIG. 2 is a perspective bottom view of the reflector.
FIG. 3 is a cross-sectional view of the reflector mounted on a road surface, and
FIG. 4 is a fragmental side view of the reflector.

The reflector marker herein includes an elongated body 1 having a cross-section in the shape of an inverted isosceles trapezoid so that the narrower side 2 is at its base.

The elongated body 1 has a top 3 and downwardly and inwardly inclined sides 4. On each side 4 is formed a reflector surface 6 by a layer of light reflective material. The light reflective material may be of any suitable substance, but preferably it is a strip of tape with light reflective particles bonded to one side and pressure sensitive adhesive on the other. Such material is sold commercially under the trademark "Scotch Life" reflective sheeting.

Each end 7 of the body 1 is also inclined downwardly and inwardly so as to expose the rounded top edge 8 to impact by vehicle wheels and protect the reflector sides of the body by relieving the ends 7.

From each lower longitudinal corner 9 of the elongated body 1 extends outwardly and downwardly a base flange 11 which also serves as a secondary reflector surface particularly as illustrated in FIG. 3.

Light rays from the lights of an approaching vehicle reflect from the reflector strip 6 directly. Light rays which strike the reflector strip 6 at a more inclined angle reflect downwardly unto the inclined base flange 11 and then upwardly at an angle back toward the source of light as indicated in broken lines 12, 13 and 14 in FIG. 3.

The underside 16 of the reflector flanges and base is concave, dished inwardly from each outer longitudinal edge 17 of each base flange 11 toward the middle of the narrow end of the reflector body 1 and is serrated.

To secure the reflector on the roadway or the like a suitable adhesive glue or resin, such as an epoxy-type resin 18 is applied to the serrated dished base surface and to the road surface, and the reflector is pressed upon the lane surface. On certain surfaces it may be desirable to also drive a concrete nail 19 through a hole 21 extending through the middle of the body 1 and into the concrete road body.

The angle of incline of the sides 4 and the ends 7 of the body 1 relatively to the vertical is about ten degrees. This undercut is sufficient to protect the surfaces against direct impact by wheels of vehicles as the tires contact only the top edges or corners of the body 1. Such incline also keeps the reflector surfaces free from mud or dirt splashed by passing vehicles. The polished base flange 11 reflects additional light so that it practically doubles ordinary luminosity of such reflectors. The dishing of the underside of the base prevents so called "butterflying" or upward curling of the edges of the base flange 11 when heavy weights roll over the reflectors.

We claim:

1. A light reflector marker for bonding to the surface of lanes, such as a highway, runway or the like comprising
   (a) an elongated body having a cross section of an isosceles trapezoid,
   (b) each longitudinal side of said body being substantially flat and inclined from the top of the body downwardly to the bottom of the body and inwardly of the body, and at least one of the sides being reflective,
   (c) an end wall at each end of the body,
   (d) a base flange extended from the bottom edge of each of the sides, at least the base flange adjacent said reflective side being reflective and being inclined away from said reflective side at such an angle as to reflect a portion of incident light rays, which are directed from above said body downwardly and generally perpendicularly to a longitudinal axis of said body, from said reflective side generally toward the direction of said incident rays,
   (e) the underside of said flanges being dished inwardly toward the bottom of said body to accommodate bonding means and to prevent upward curling of the edges of said flanges when subjected to heavy loads.

2. A light reflector marker as defined in claim 1, and
   (f) each of said end walls being inclined downwardly and inwardly to expose only the top of said body to impact by tires of vehicles riding thereover.

3. A light reflector marker as defined in claim 1, and
   (f) the underside of said dished flanges being serrated.

References Cited by the Examiner
UNITED STATES PATENTS

| 1,546,146 | 7/25 | Shaffer | 88—79 |
| 1,736,830 | 11/29 | McKee et al. | 88—79 |
| 1,778,110 | 10/30 | Hartzler et al. | 88—79 |
| 1,789,525 | 1/31 | Hoff | 88—79 |
| 1,986,097 | 1/35 | Arey | 88—79 |
| 2,135,400 | 11/38 | Johnson | 94—1.5 |
| 2,666,373 | 1/54 | Mattson | 88—79 X |
| 3,015,095 | 12/61 | Petri | 88—78 X |

FOREIGN PATENTS

| 692,206 | 6/53 | Great Britain. |

JEWELL H. PEDERSEN, *Primary Examiner.*